No. 764,876. PATENTED JULY 12, 1904.
J. ALEXANDER.
HORSESHOEING APPARATUS.
APPLICATION FILED APR. 13, 1904.
NO MODEL.

Witnesses
Adelaide Kearns
J. A. Walsh

Inventor
Joseph Alexander
By Bradford & Hood
Attorneys

No. 764,876. Patented July 12, 1904.

UNITED STATES PATENT OFFICE.

JOSEPH ALEXANDER, OF NORTH VERNON, INDIANA.

HORSESHOEING APPARATUS.

SPECIFICATION forming part of Letters Patent No. 764,876, dated July 12, 1904.

Application filed April 13, 1904. Serial No. 203,044. (No model.)

*To all whom it may concern:*

Be it known that I, JOSEPH ALEXANDER, a citizen of the United States, residing at North Vernon, in the county of Jennings and State of Indiana, have invented certain new and useful Improvements in Horseshoeing Apparatus, of which the following is a specification.

The object of my said invention is to produce a simple and efficient apparatus for the use of horseshoers whereby they are enabled to shoe or plate horses without the necessity of supporting the animal and whereby the animal is relieved from strain while being shod.

Figure 1:
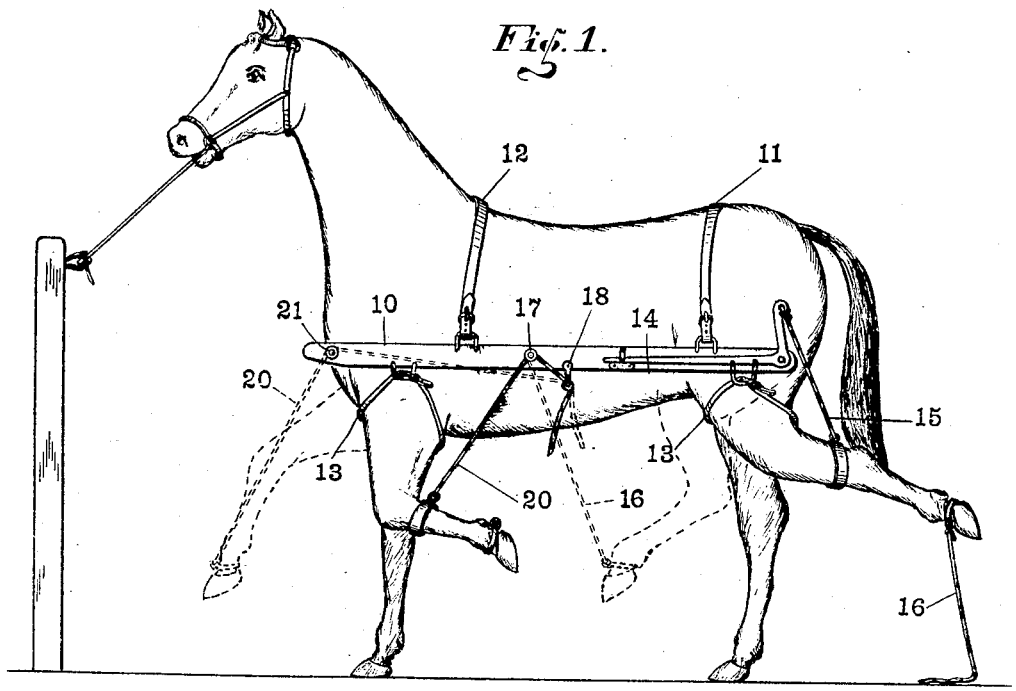
Figure 2:
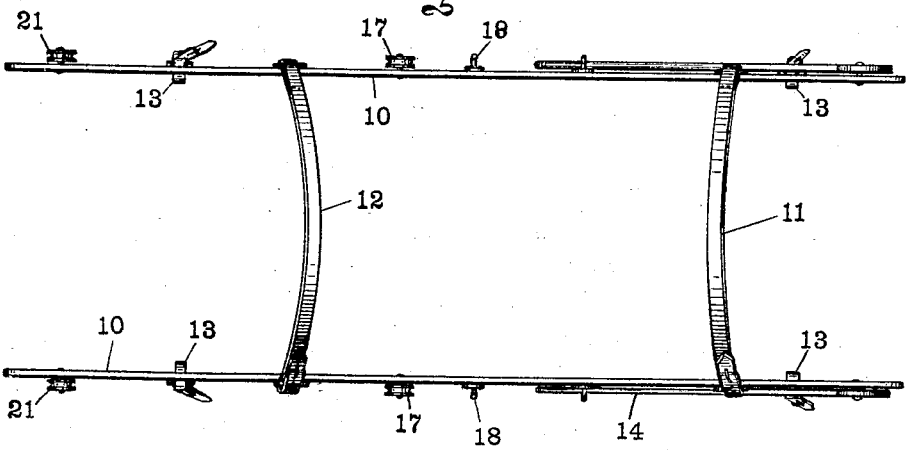

Referring to the accompanying drawings, which are made a part hereof and on which similar reference characters indicate similar parts, Figure 1 is a side elevation illustrating the manner in which the device is employed, different positions of the legs of the animal when the hoofs are being treated being shown by dotted lines; and Fig. 2 is a plan view with the leg-raising straps omitted.

In said drawings, 10 indicates the side bars, which are supported upon the animal by the usual hames and hind strap, (when the animal is in harness,) or said bars may be suitably connected by straps 11 and 12 or otherwise, so that the apparatus as a whole may be placed upon the animal when either in or out of harness. Straps 13 are connected to said bars 10, which are adapted to be secured about the legs of the animal near the body, whereby the side bars are held securely in position. At the rear end of one or both of said bars I provide a lever 14, to which is connected a sling 15, adapted to pass around the hocks or other parts of the hind legs, and by manipulation of this lever I am enabled to raise the leg, so as to bring the hoof to the proper position for shoeing. After the shoe is nailed to the hoof I am enabled by use of the strap 16, attached to the leg and passing up over pulley 17, to draw the hoof upward and forward into position for clenching, the end of said strap after properly positioning the hoof being secured to the hook or other suitable securing device 18. When working upon the fore legs of the animal, I employ the straps 20, which are looped about the knee and brought over pulley 17 to raise the hoof to shoeing position, securing said strap to hook 18, and when raising the hoof upward and forward to clenching position I also employ said strap 20, bringing the same around over pulley 21 and securing it in position, as before.

As will be readily understood the apparatus may be rigged up as a whole to be applied to an animal not in harness, or, if preferred, for harnessed animals the bars may be secured independently to the harness, and, as will also be understood, by the manipulation of the lever and straps in the manner indicated the animal may be quickly and safely secured in position while the hoofs are being treated.

Having thus fully described my said invention, what I claim as new, and desire to secure by Letters Patent, is—

1. In an apparatus of the class described, the combination of suitable side bars, connections between said bars whereby the same are supported upon the animal, a lever supported by one of said bars, straps operated by said lever, strap-guiding means, and strap-securing means, substantially as shown and described.

2. An apparatus of the class described comprising side bars, means for connecting the same, straps for securing said bars to the animal, a lever, a sling connected to said lever, straps for raising the hind legs, straps for raising the fore legs, and means for securing said straps in position.

In witness whereof I have hereunto set my hand and seal, at North Vernon, Indiana, this 19th day of March, A. D. 1904.

his
   JOSEPH × ALEXANDER. [L. S.]
     mark

Witnesses:
 A. J. ALEXANDER,
 V. F. FARRON,
 FRED WILLMAN,
 SHELBY HOWARD.